Sept. 14, 1948.  T. A. RICH  2,449,413
SENSITIVE DIRECT CURRENT MEASURING APPARATUS
Filed July 11, 1945  2 Sheets-Sheet 1
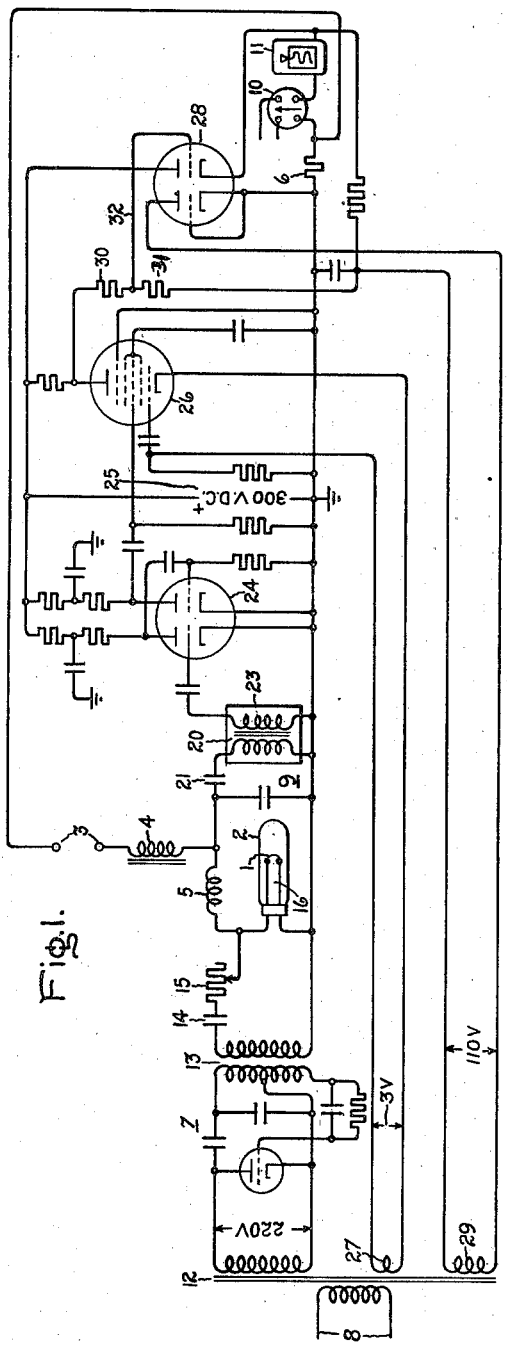
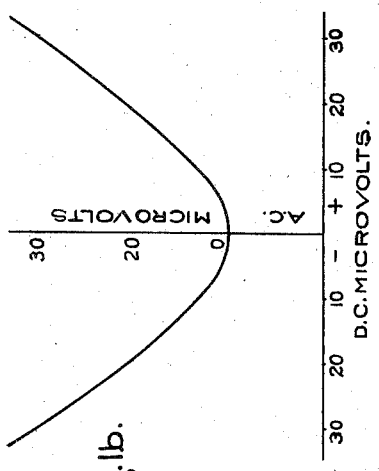
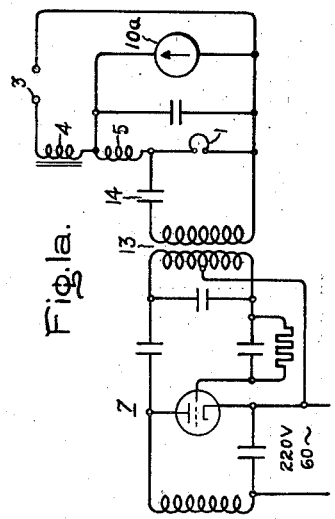
Inventor:
Theodore A. Rich,
by *Crowell P. Nick*
His Attorney.

Sept. 14, 1948.  T. A. RICH  2,449,413
SENSITIVE DIRECT CURRENT MEASURING APPARATUS
Filed July 11, 1945  2 Sheets-Sheet 2
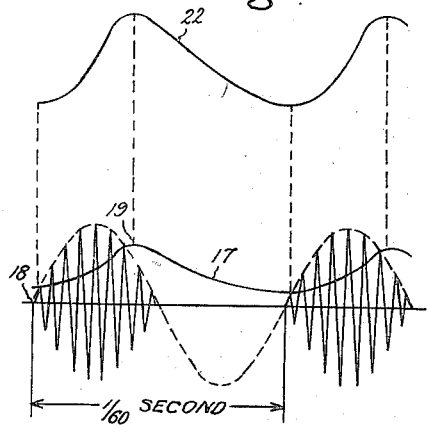
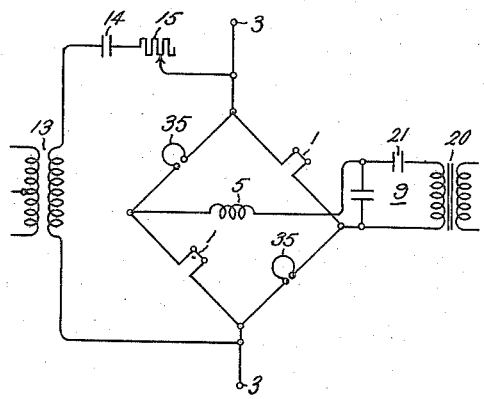
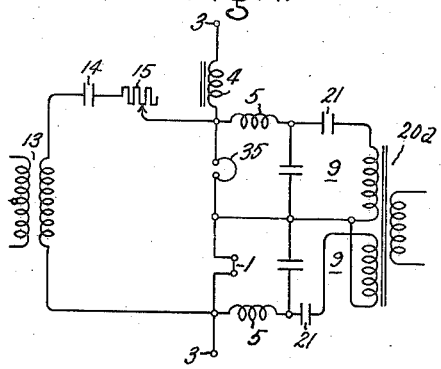
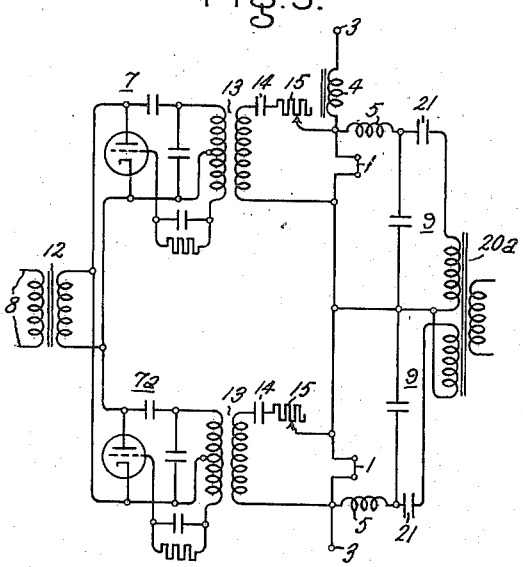
Inventor:
Theodore A. Rich,
by *Prowell P. Mack*
His Attorney.

UNITED STATES PATENT OFFICE 2,449,413

SENSITIVE DIRECT-CURRENT MEASURING APPARATUS

Theodore A. Rich, Schenectady, N. Y., assignor to General Electric Company, a corporation of New York Application July 11, 1945, Serial No. 604,398

4 Claims. (Cl. 179—171.5)

My invention relates to highly sensitive apparatus which is responsive to the magnitude and polarity of minute direct current voltages or currents and may be generally used for indicating, recording and control purposes. While the apparatus has a sensitivity comparable to the more sensitive laboratory galvanometers, it is adapted for rugged construction and portability so as to be available for use in the factory.

In carrying my invention into effect, use is made of one or more small temperature sensitive resistance wires called monodes which are heated by a high frequency current, the high frequency current being modulated at commercial frequency such that the monode is alternately heated and cooled and hence pulsates in resistance at the modulated frequency. The D. C. to be measured, whether current or voltage, is impressed on a circuit including the monode such that the D.-C. voltage across the monode pulsates with the change in monode resistance, and the component of this voltage variation is picked out, preferably by a tuned circuit to produce an alternating voltage of the modulating frequency which voltage is proportional to the D. C. to be measured and reverses in phase with reversals in D.-C. polarity. The two alternating currents of different frequency and D. C., all associated with the monode, are segregated by the use of suitable circuit constants.

The features of my invention which are believed to be novel and patentable will be pointed out in the claims appended hereto. For a better understanding of my invention reference is made in the following description to the accompanying drawing wherein Fig. 1 represents a wiring diagram of a preferred form of my invention. Fig. 1a is a simplified wiring diagram that may be used where D.-C. polarity is not important. Fig. 1b is an input-output curve explanatory of Fig. 1a. Fig. 2 shows curves which will be referred to in explaining my invention. Figs. 3, 4 and 5 show different monode combinations.

Referring to Fig. 1, the heart of my invention consists of a small temperature sensitive resistance filament 1 preferably enclosed in a bulb 2 which may be filled with hydrogen at atmospheric pressure and termed a monode. The direct current or voltage, the polarity and magnitude of which are to be detected and measured, is fed through this filament. Such D.-C. may be applied at the terminals at 3 and passes through filament 1 by way of choke coils 4 and 5 and a negative feedback control resistance at 6. The filament 1 is also fed from a high frequency oscillator 7 modulated at a lower frequency, for example 60 cycles, from a source 8. The high frequency pulsations are so rapid that the filament temperature will not follow the individual cycles. It will follow the envelope of the high frequency, however, and as a result, the filament 1 is heated and cooled at the 60-cycle rate, and its resistance is varied accordingly. However, no 60-cycle voltage appears across the terminals of the filament 1 unless a direct current is also flowing therethrough. In case of direct current flow the direct current voltage drop across the monode pulsates with rise and fall of the resistance of the monode at the 60 cycle rate by an amount and in a direction dependent upon the magnitude and polarity of the current or voltage to be measured, and a 60-cycle voltage then appears across the monode of corresponding magnitude and phase relation. This 60-cycle voltage is picked up and amplified by a circuit 9 tuned to its frequency and suitable electronic amplifying apparatus sensitive to the phase of the 60-cycle current, resulting in a direct current of measurable magnitude proportional to the D.-C. input and of the same polarity. This direct current output may be used to operate an indicating and control instrument indicated at 10 or a recorder indicated at 11, or other direct current responsive apparatus. Having thus briefly outlined the main features of the invention, a more detailed description of the circuit represented will be given.

The oscillator at 7 needs no particular explanation except to point out that it is a conventional electronic tube oscillator fed through a transformer 12 at the modulating frequency of several cycles per second assumed to be 60 cycles from the source 8, and adjusted to produce a frequency sufficiently high to be choked out of the 60 cycle output circuit at 9. The oscillator frequency may, for example, be anywhere from three million to 20 million cycles per second. It produces an output which may be represented by the shaded ovals in the lower part of Fig. 2 where the dotted line sine wave envelope represents the 60-cycle input frequency. It is noted that the oscillator passes current only when its plate is positive or on the positive half-cycles of the 60-cycle wave. The oscillator output is fed to the filament 1 through an air core transformer 13, a condenser 14, and an adjustable resistance 15. This circuit is tuned to the high frequency used. The condenser 14 prevents any direct current from source 3 from passing through the secondary winding of transformer 13, and the resistance 15 permits adjustment for the desired value of high frequency heating current.

The design of the monode is important for best results. Theoretically, the filament 1 need not be enclosed but might operate in air. However, it is enclosed for protection, and more uniform heating and cooling; and the use of a hydrogen atmosphere within the bulb 2 permits of quick cooling and hence more sensitive action as will be evident presently. The filament itself may be of platinum wire of the order of 0.0002 in. in diameter and 3/16 in. long, and supported by platinum lead-in wires 16, 0.02 in. in diameter. The filament used in the monode should have an appreciable temperature coefficient of resistance. It could have either a positive or negative temperature coefficient of resistance if materials otherwise suitable were available. Platinum has a positive temperature coefficient of resistance as do most materials best suited for the purpose in question. It should be capable of withstanding large changes in temperature at a rapid rate. It is important that the monode produce no overall thermocouple effect. This is best assured by making the filament 1 and lead-in wires of the same materials and making the lead-in wires from the same adjacent piece of wire to avoid slight differences in purity, etc., which might cause an unbalanced thermocouple effect at the two junctions at the ends of the filament. The design of the monode is otherwise such that the filament temperature and resistance vary with the 60-cycle frequency envelopes represented in Fig. 2 such that the curve 17 superimposed on Fig. 2 may represent the variation in temperature and resistance of the monode filament. For example, the filament may have a resistance of 15 ohms at room temperature. When being heated and cooled at the 60-cycle rate, it may vary between 20 ohms at the beginning of the heating period at point 18 to 60 ohms near the end of the heating period at about point 19 on the curve 17, Fig. 2. For the filament specified, this corresponds to a temperature variation between about 150 and 900 degrees C.

Such variation in voltage as this heating and cooling may cause across the monode does not produce any 60-cycle voltage thereacross when there is no direct current flowing through the monode. Such voltage variation as may be produced is a high frequency variation and this is prevented from producing current in the output circuit 9 to the transformer 20 by reason of the high frequency choke coil at 5 and a high frequency bypass condenser across the transformer primary circuit.

Assume now a small direct current voltage at terminals 3. This produces a current flow from lower terminal 3 through coils 4 and 5, the filament 1 of the monode, negative feedback resistance 6, back to the upper terminal 3. This direct current is prevented from flowing into the windings of transformers 13 and 20 by the condensers 14 and 21. The direct current flowing through monode 1 produces a direct current voltage thereacross which is superimposed on the high frequency voltage across the monode. Due to the 60-cycle change in resistance of the monode (curve 17, Fig. 2), the direct current voltage drop across the monode has a 60-cycle variation which may be represented by the curve 22, Fig. 2, this voltage being high when the monode resistance is high and low when the monode resistance is low. The direct current measuring circuit contains resistance other than the monode, for instance, choke coils 4 and 5 and resistance 6, so that if a voltage is being measured, a direct current voltage variation across the monode of the character represented at 22, Fig. 2, will result. If a direct current is being measured, there will likewise be a direct current voltage drop across the monode of like variation. This variable direct current voltage produces a 60-cycle current in the circuit of the primary of transformer 20. Choke coil 4 is designed to prevent 60-cycle current flowing through the direct current circuit, and the tuning of the high frequency circuit is such that 60-cycle current does not appreciably flow therein.

A capacitance 21 in series with the transformer primary comprises a circuit preferably but not necessarily tuned to 60 cycles, which augments the flow of 60-cycle current in the primary winding of transformer 20. The 60-cycle current output of the monode is proportional to the direct current or voltage to be measured, and it will be evident that it reverses in phase with reversal in polarity of the direct current voltage or current. That is, curve 22, Fig. 2, represents D.-C. voltage variation across the monode but not necessarily polarity. The alternating current output of the monode could be represented approximately by such curve 22 when the direct current voltage or current being measured is of one polarity, and another curve 180 degrees out of phase with curve 22 could represent the 60-cycle output current for the reverse direct current polarity. Curve 22 is not necessarily a sine wave but the resulting alternating current output to transformer 20 is shaped by the circuit constants used and is essentially a sine wave.

The direct current which flows through the monode from the measuring terminals 3 is too insignificant to have any noticeable effect upon the heating of filament 1 and is not used for that purpose.

The root mean square value of high frequency voltage across the monode will usually be of the order of 50,000 times the direct current voltage thereacross for the upper ranges of measurement, and when it is appreciated that the heating is proportional to the root mean square of the heating current and the D.-C. current it will be evident that the energy for producing the resistance changes in the monode comes from the high frequency circuit and not from the direct current measurement terminals 3. In most practical applications the heating of the D.-C. current is less than a hundred-millionth of 1%. The direct current drawn by the monode will be less than a microampere. As a further explanation of the monode action, assume that the D.-C. voltage being measured is 100 microvolts; that the 60-cycle cool and hot resistance variation of the monode is 20 and 60 ohms, respectively; and that the additional resistance in the direct current circuit is 60 ohms. The resistance changes and D.-C. voltage variation will then be as follows:

|  | Monode | Other Resistance |
|---|---|---|
| Cool: | | |
| Resistance_____ohms__ | 20 | 60 |
| Voltage Drop_____microvolts__ | 25 | 75 |
| Hot: | | |
| Resistance_____ohms__ | 60 | 60 |
| Voltage Drop_____microvolts__ | 50 | 50 |

This produces a 60-cycle D.-C. voltage variation of 25 microvolts or 25 per cent of the measurement voltage across the monode. The percentage variations remain constant regardless of the measurement voltage. It is thus seen that the D.-C. measurement voltage is converted into a proportional alternating current voltage of standard frequency which can be easily amplified to the extent desired and then rectified by conventional apparatus, so as to operate rugged D.-C. measuring and control apparatus; that the phase of the alternating current voltage shifts 180 degrees for changes in the polarity of the D.-C. voltage, so that the latter can be readily detected; and that this is accomplished without drawing any appreciable power from the D.-C. measuring circuit by a relatively small amount of rugged apparatus without moving contacts which may be housed in a carrying case and made portable. The apparatus has a sensitivity and measuring accuracy hereto available only in expensive, essentially nonportable laboratory equipment.

Where the polarity of the D.-C. voltage or current to be measured is not important, a high sensitivity A.-C. voltmeter 10a may be used to measure the 60-cycle A.-C. output voltage of the monode detector as represented in Fig. 1a. The input-output action of this simplified arrangement may be as represented in the curve of Fig. 1b where the curve represents the A.-C. output voltage to instrument 10a for different values of D.-C. input voltage at terminals 3. It is noted that an appreciable A.-C. output voltage may be present at zero D.-C. input voltage. This A.-C. output voltage at zero D.-C. input is generally speaking the noise level of the device and may be due to slight thermocouple action in the monode, stray flux fields in the choke 4, etc., and the lower this noise level is the better sensitivity we will have at the lowest D.-C. input voltages and emphasizes the importance of care in avoiding thermocouple action, in proper shielding, etc. It is further noted that in the simple arrangement of Fig. 1a the voltmeter 10a does not indicate the polarity of the D.-C. input at terminals 3 and where it is desired to indicate polarity as well as value of D.-C. input, this can be done and one way of accomplishing this as well as obtaining a larger amplification factor will be explained by further reference to Fig. 1.

It is important that the transformer 20, Fig. 1, be well shielded as represented at 23 to prevent the pickup of stray alternating fluxes. The high frequency oscillator circuit shielding should conform to the usual good practice consistent with the high frequency employed. The output from transformer 20 should be zero when the direct current measurement voltage or current is zero at terminals 3 and, in general, to the extent that this is not accomplished by proper design and shielding of the monode controller apparatus, measurement error may result. The transformer used at 20 will be a step-up transformer, and will generally have an output voltage of the order of 35 times the direct current voltage variation input to the tuned circuit 9, most of this voltage amplification being accomplished by the tuned circuit.

The electronic amplifier arrangement, including the phase or polarity sensitive and rectifier means, and the negative feedback arrangement between the transformer 20 and the direct current meters or control devices at 10 and 11 may take a variety of forms, and any arrangement suitable for the particular measurement problem involved may be employed. The arrangement illustrated in Fig. 1 is one of many circuits suitable for accomplishing the desired results and does not involve anything particularly novel. The two-stage electronic amplifier represented at 24 supplied from a direct current source 25 and with its input controlled from transformer 20 may have an amplification gain of, say, 2500 times. Twenty-six (26) represents a pentagrid converter tube, the third and control grid of which is coupled with and responds to the output of the second stage of the amplifier apparatus 24. A phase reference voltage from a winding 27 of transformer 12 is capacitance connected between the cathode and the first and control grid of converter tube 26. Converter tube 26 will therefore have a plate output voltage proportional to the magnitude of the control voltage on its third grid and the phase relation of this control voltage with respect to that applied on its first grid from winding 27.

Tube 28 includes a rectifier in its left side and an amplifier in its right side. The rectifier is supplied from the A.-C. voltage from a secondary winding 29 of transformer 12. The rectifier voltage is compared to the plate voltage of converter tube 26 through the resistances 30 and 31, and a voltage proportional to the average of their voltage is supplied to the control grid of the amplifier through connection 32. The indicating and control instrument 10 and the recording instrument 11 are connected in the cathode circuit of the amplifier triode in tube 28. Since it is difficult to reduce the amplifier current to zero, a small negative current supplied by the rectifier tube is introduced so that current in 6, 10, 11 can be zero even though the amplifier tube passes some current. As a result of this arrangement the instrument current will be proportional to the direct current voltage across terminals 3. Also, the direction of current flow through instrument 10 will depend upon the D.-C. polarity at terminals 3. The resistance 6 is included in this cathode connection, and the current from terminals 3 flows therethrough in such a direction as to oppose the predominating current through instrument 10 and serves as a negative feedback to render the measurement system more stable in operation than would otherwise be the case.

To indicate the sensitivity of the measuring system as thus designed, 5-milliamperes full scale on instrument 10 corresponds to about 20 microvolts signal across terminals 3. This corresponds to about one-half degree change in temperature on a single couple copper-copnic thermocouple. For example, if such a thermocouple were connected to terminals 3, a one-half degree change in temperature of the thermocouple would produce full scale deflection on a 5-milliampere direct current measuring instrument at 10.

Without limiting my invention to any particular set of values for circuit constants, voltages, etc., it may be stated that good results may be obtained with values heretofore mentioned. The values of suitable supply voltages have been indicated on Fig. 1. For segregating the high and low frequency alternating currents and the D.-C. voltage associated with the monode and with a 20-megacycle oscillator at 7, the capacitance at 14 may be a 50-micromicrofarad condenser. Choke coil 5 may have an inductance of three millihenrys and a resistance of 10 ohms. With a 60-cycle modulating frequency the choke coil at 4 may have a D.-C. resistance of one ohm and an A.-C. impedance at 60 cycles of 200 ohms. This coil is even more effective than a series resistance. If the inductance were very large the D.-C. current produced by a D.-C. voltage would not change due to resistance variations. If the resistance of the circuit were all in the monode then the $$\text{current} = \frac{2Vdc}{R_{min}+R_{max}}$$

In the example used $$I = \frac{2Vdc}{20+60} = \frac{Vdc}{40}$$

The minimum voltage drop would be $$\frac{20V}{40} = 0.5V$$

and the maximum voltage drop $$\frac{60V}{40} = 1.5V$$

and the difference=V. It will be seen this is 4 times as great as the example given where series resistance is used. The capacitance 21 in the 60-cycle circuit may be a one-microfarad condenser, and the other condenser connected across the tuned circuit 9 may have 0.05 microfarad and is used to assist in filtering out the high frequency.

In addition to the monode described there are other monodes and combinations that might be used. It is of course obvious that a monode resistance having a negative instead of a positive temperature coefficient of resistance might be used in Fig. 1.

Figs. 3, 4 and 5 represent monode combinations that might be used. In Fig. 3 four monodes are used in a Wheatstone bridge combination. Similar monodes 1 in opposite arms of the bridge may be like that previously described having a positive temperature coefficient of resistance. Similar monodes 35 have a negative temperature coefficient of resistance and are connected in the two other opposite arms of the bridge. The remainder of the circuit may be essentially like that of Fig. 1 except that the high frequency and D.-C. connections are made across one pair of opposite terminals of the bridge, while the 60-cycle tuned circuit 9 is excited from across the two other opposite terminals of the bridge. As a matter of fact it is immaterial which opposite terminals are connected to the high frequency source. It will be evident that when the bridge monodes are heated, the D.-C. voltage across the 60-cycle exciting terminals will be in one direction and when cooled, it will reverse. This D.-C. voltage variation will be proportional to the direct current of terminals 3 and will reverse in polarity with the D.-C. polarity. The positive and negative half-cycles of the 60-cycle voltage will be equal and symmetrical, and the entire drop in the direct current between terminals 3 may be utilized across the bridge.

In Fig. 4 half the bridge circuit of Fig. 3 is used. Two 60-cycle tuned circuit output circuits are used, one connected across the resistance 35 having the negative temperature coefficient of resistance, and the other connected across the positive temperature coefficient of resistance monode 1. These 60-cycle circuits feed two primary coils of the 60-cycle output transformer 20a and are reversely connected to correspond to the inverse manner in which the D.-C. voltage across the series connected monodes 35 and 1 varies, so as to produce boosting or additive transformer action.

Fig. 5 comprises two monode circuits like that of Fig. 1. The D.-C. excitation is supplied in series relation. The high frequency oscillator 7 heats the upper monode during one half-cycle, and the high frequency oscillator 7a heats the lower monode during the reverse half-cycle of the modulating frequency, the two high frequency circuits being reversely connected to the input transformer 12 so as to operate alternately. The monodes are preferably similar and have similar temperature variations. The tuned output circuits 9 feed reversely connected primary coils of the output transformer 20a. It will be evident that when the D.-C. voltage drop across one monode is high, the other is low and vice versa. This arrangement has the advantages of Figs. 3 and 4, of symmetrical and equal alternate half-wave outputs which can utilize the entire D.-C. voltage drop between the terminals 3, at constant D.-C. volt-ampere burden. Elements in Figs. 3, 4, and 5 not especially mentioned correspond to similarly numbered elements of Fig. 1 already described. While not shown, it will of course be evident that a reverse feedback stabilization scheme may be used in Figs. 3, 4, and 5.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In direct current responsive apparatus, a monode comprising a bulb containing an atmosphere of hydrogen and a platinum resistance wire of the order of 0.0002 in. in diameter and $\frac{7}{16}$ in. long connected between similar platinum lead-in-wires, a high frequency oscillator supplied from a low frequency source by means of which the output of the oscillator is modulated and restricted to operation in alternate half-cycles of the low frequency source, connections for including the monode in the output circuit of said oscillator whereby the resistance wire thereof is alternately heated and allowed to cool during alternate half-cycles of the low frequency source, connections for including said monode in a direct current circuit such that a D.-C. voltage appears across the monode terminals proportional to current flow in the direct current circuit which voltage has a cyclic variation corresponding to the changes in the temperature and resistance of said wire, an alternating current circuit tuned to the frequency of the low frequency source excited by the D.-C. voltage variation across said monode, the circuit constants of the high and low frequency circuits associated with said monode being such that the corresponding currents are confined to their respective circuits and the flow of direct current therein is prevented.

2. In direct current responsive apparatus, a direct current circuit containing a resistance having a positive temperature coefficient of resistance and a resistance having a negative temperature coefficient of resistance connected in series relation in said circuit, a high frequency oscillator modulated at a lower frequency so as to operate only during alternate half-cycles of the modulating frequency connected across said resistances for alternately heating the same and allowing them to cool at the modulating frequency rate, alternating current circuits tuned to the modulating frequency connected across each of said resistances, a transformer having two primary windings, one included in each of said tuned circuits, and a secondary winding, the high and low frequency circuits and the D.-C. circuit associated with said resistances having such constants that the corresponding currents are confined to their respective circuits, the two tuned circuits being excited by the D.-C. voltage variations across said resistances to cause alternating currents at the modulating frequency, of reversed phase relation and proportional to the D.-C. current flow through said resistances to excite said transformer, the primary windings being connected to produce boosting transformer action with respect to the primary winding currents.

3. In direct current responsive apparatus, a direct current circuit containing a resistance having a positive temperature coefficient of resistance and a resistance having a negative temperature coefficient of resistance connected in series relation in said circuit, a high frequency oscillator modulated at a lower frequency so as to operate only during alternate half-cycles of the modulating frequency connected across said resistances for alternately heating the same and allowing them to cool at the modulated frequency rate whereby when direct current is flowing in said direct current circuit the D.-C. voltages across said resistances vary inversely with respect to each other at such modulated frequency rate, an alternating current output circuit, and circuit coupling means between said output circuit and said resistances tuned to said modulated frequency for exciting said output circuit in response to the inverse voltage variations across said resistances.

4. In a system for converting minute direct current into alternating current, a monode comprising a bulb containing a cooling gas and a platinum resistance wire of the order of 0.0002 in. in diameter and $\frac{3}{16}$ in. long connected between similar platinum lead-in wires of the order of 100 times the cross section of the resistance wire, means for connecting said resistance wire in a direct current circuit the current of which is to be converted, means for periodically heating said resistance wire and allowing it to cool at a frequency corresponding to the frequency of a commercial alternating current circuit whereby when direct current is flowing through said resistance the D.-C. voltage variation thereacross pulsates at such frequency, and an alternating current output circuit excited in response to such D.-C. voltage variations.

THEODORE A. RICH.

REFERENCES CITED

The following references are of record in the file of this patent:

UNITED STATES PATENTS

| Number | Name | Date |
| --- | --- | --- |
| 1,039,925 | Gati | Oct. 1, 1912 |
| 2,302,049 | Parker et al. | Nov. 17, 1942 |
| 2,364,483 | Side | Dec. 5, 1944 |
| 2,367,868 | Jones | Jan. 23, 1945 |
| 2,399,481 | George | Apr. 30, 1946 |